UNITED STATES PATENT OFFICE.

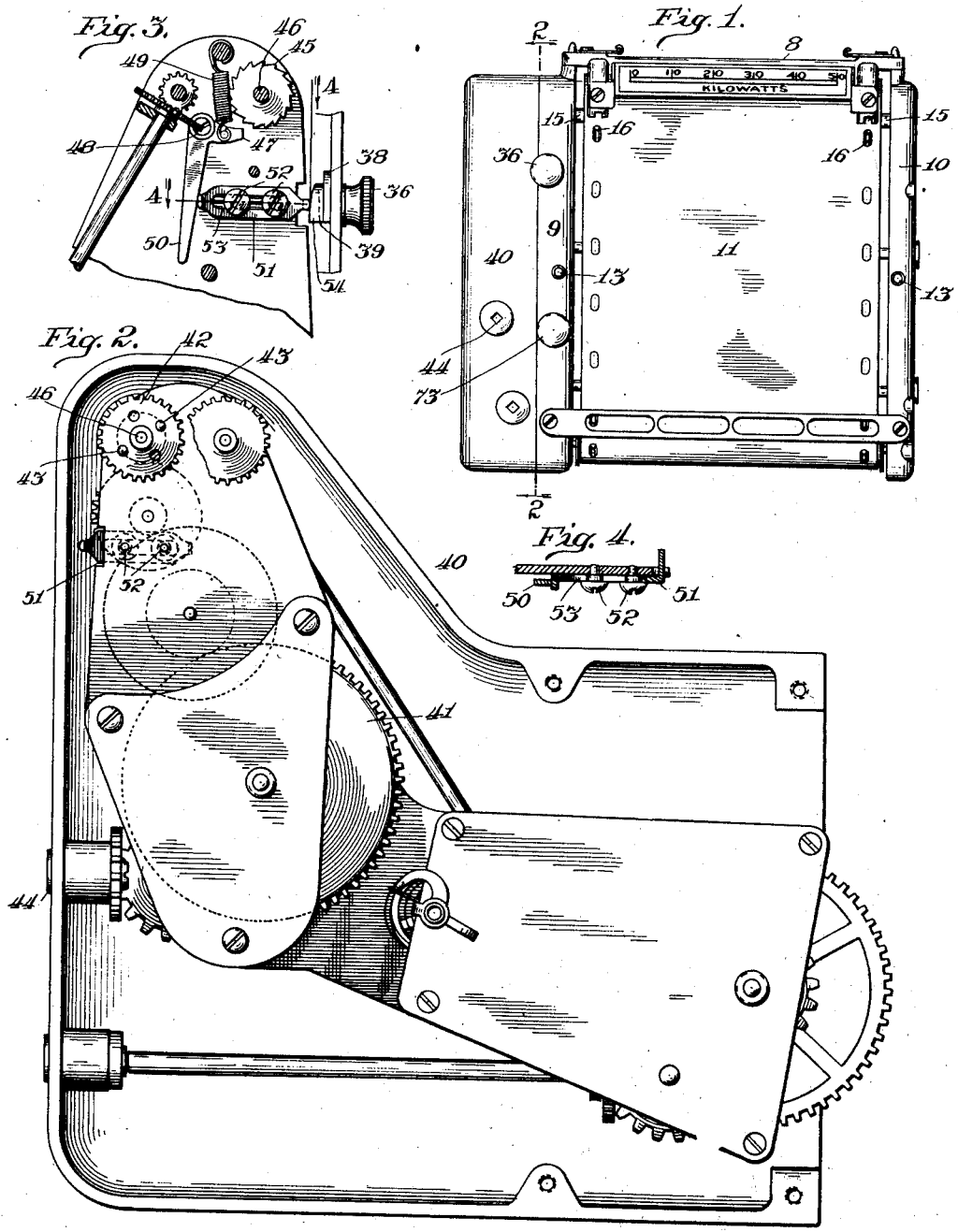

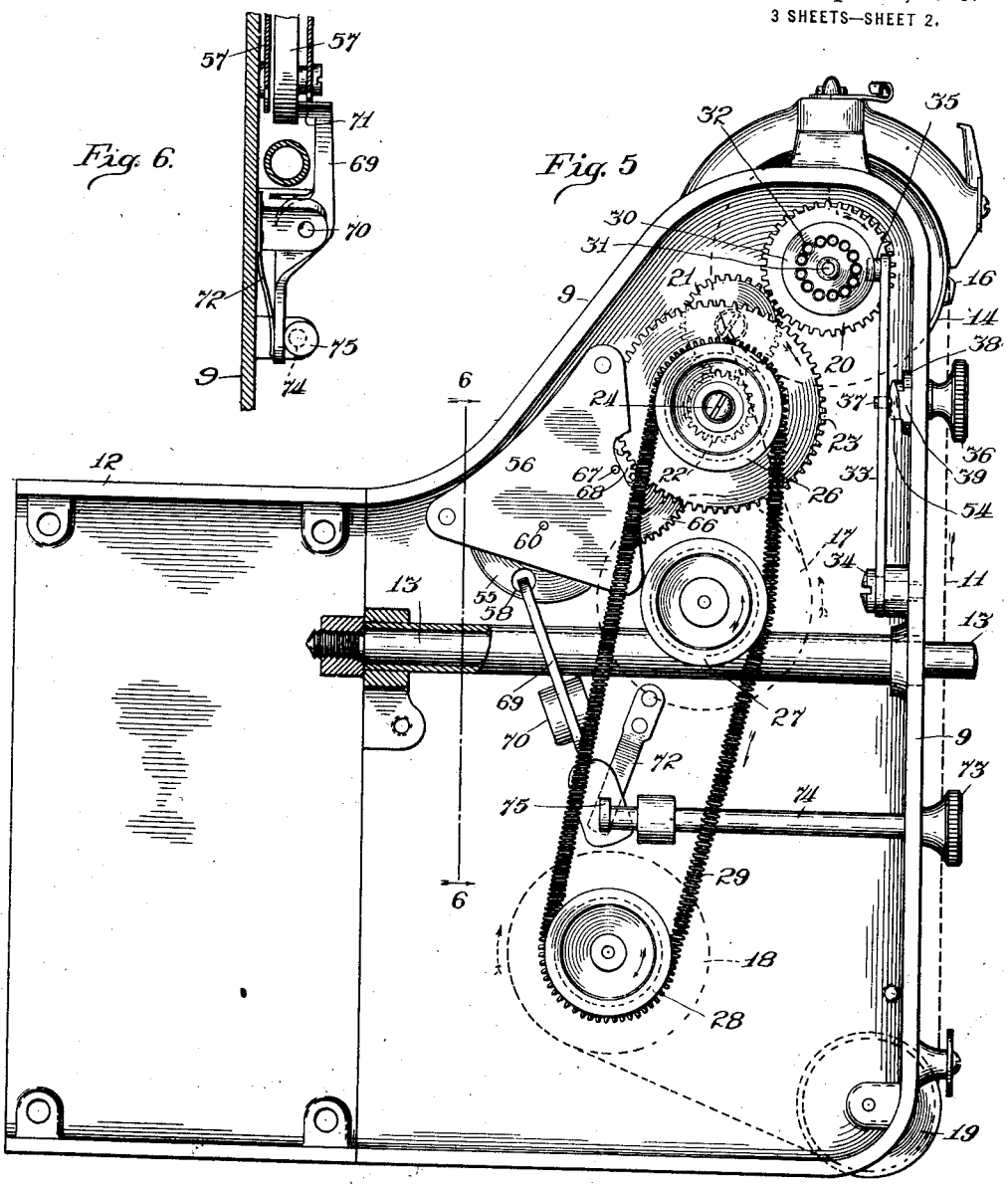

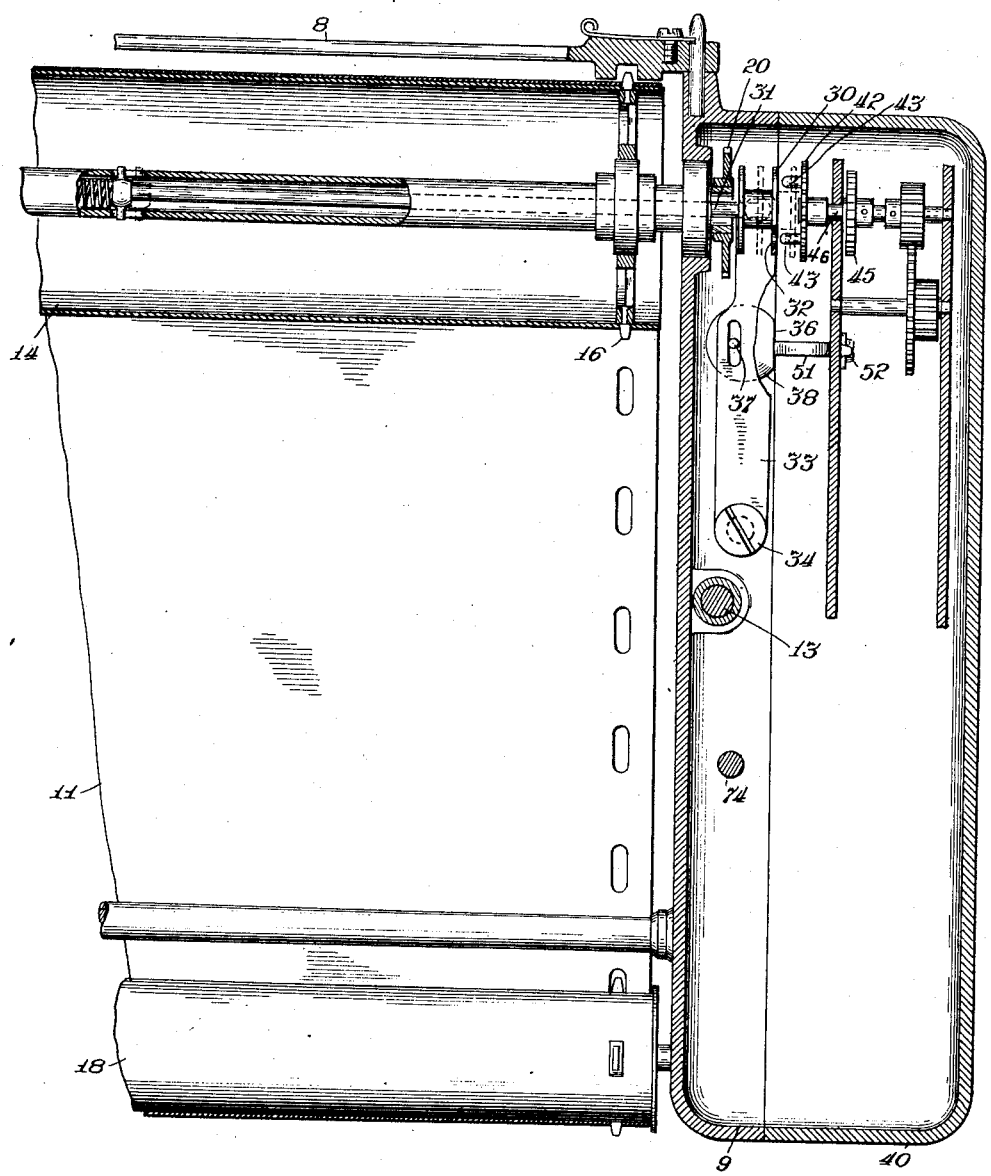

OTIS WHITE AND ROBERT C. LANPHIER, OF SPRINGFIELD, ILLINOIS, ASSIGNORS TO SANGAMO ELECTRIC COMPANY, OF SPRINGFIELD, ILLINOIS, A CORPORATION OF ILLINOIS.

GRAPHIC RECORDING INSTRUMENT.

1,316,657.  Specification of Letters Patent.  Patented Sept. 23, 1919.

Application filed October 14, 1916. Serial No. 125,707.

*To all whom it may concern:*

Be it known that we, OTIS WHITE and ROBERT C. LANPHIER, citizens of the United States, and residents of Springfield, in the county of Sangamon and State of Illinois, have invented certain new and useful Improvements in Graphic Recording Instruments, of which the following is a specification, reference being had to the accompanying drawings.

Our invention relates to graphic recording instruments of the type referred to in an application for patent filed of even date herewith, Serial No. 125,730, by Otis White and Herbert W. Young. Briefly, such instruments comprise a chart or paper ribbon movable over a platen or equivalent support by suitable driving mechanism, the record to be obtained being made on the chart as it moves by a stylus supported in front of the chart and moved transversely thereof to correspond with the variations or fluctuations of which a record is being made. Usually such instruments are employed to record variations such as of quantity and pressure in electric circuits of various kinds, but the improvements which form the subject-matter of this application are not limited to use with electric measuring instruments, but may be employed for any purpose for which they are adapted. In the embodiment of our invention illustrated, they however are shown as applied to a graphic recording instrument constructed as shown and described in said White and Young application and equipped with driving mechanism having the general construction shown and described in an application filed of even date herewith, Serial No. 125,733, by Otis White, one of the present joint inventors.

The driving mechanism described and claimed in the said Otis White application is designed to operate the chart at a variety of speeds, ranging, say, from three-quarters of an inch per hour to twelve inches per hour, but at all speeds the movement of the chart is directly and accurately controlled by a chronometer which does not itself vary as it is intended to be an accurate time-measuring instrument. The chart is moved by a driving motor acting through intermediate devices, the speed of certain members of which is controlled by the chronometer, and by varying certain of such intermediate devices, the speed of the chart is varied without in any way affecting the operation of the chronometer, which continues to regulate the movement of the chart at all speeds. For certain uses, however, such as for taking acceleration curves of motors, etc., it is desirable to operate the chart at a much higher speed than is provided for by the mechanism shown and described in said Otis White application—at, for example, as high a rate as three-quarters of an inch per second—and our present inventior has for its object to provide mechanism by which this may be effectively accomplished.

In the accompanying drawings,—

Figure 1 is a front view of the chart-holding frame and the motor housing of a graphic recording instrument like that shown and described in said White & Young application;

Fig. 2 is an enlarged interior elevation of the motor housing, being a view taken on line 2—2 of Fig. 1, looking to the left;

Fig. 3 is a detail illustrating certain parts of the driving mechanism;

Fig. 4 is a partial section on line 4—4 of Fig. 3;

Fig. 5 is an enlarged side elevation of the chart-holding frame and part of the base of the instrument, showing the devices for supporting and moving the chart and for governing its operation at high speed;

Fig. 6 is a partial vertical section on line 6—6 of Fig. 5;

Fig. 7 is a detail, partly broken away, illustrating the construction of the governor; and Fig. 8 is a partial transverse vertical section of the motor housing and chart carrying frame assembled, but unlocked, taken on the line of the axis of the platen.

Referring to the drawings,—

8 indicates the chart-holding frame, of which 9—10 are side members. 11 indicates the chart. 12 indicates a part of the base, which is designed to carry the different parts of the instrument, as fully shown and described in said White & Young application. Only a part of the base is herein shown, as the devices for supporting the stylus, and the mechanism for moving it transversely of the chart, form no part of our present invention, and therefore we have not thought it necessary to illustrate them or the parts by which they are supported and operated. For the purposes of the present application it will suffice to explain that the chart-holding frame is detachably connected with the base in such manner that it may be removed by drawing it forward upon two forwardly-projecting rods 13 secured to the base and passing through bearings in the members 9—10 of the chart-holding frame, as shown in Figs. 1 and 5. The chart-holding frame carries a cylindrical platen 14 mounted on a tubular shaft 15, the ends of which are journaled in the side members 9—10, the connections between said platen and said tubular shaft being in the form of two sprocket-wheels 16 which are mounted on the shaft 15 and project through the periphery of the platen, as shown in Figs. 1 and 5. This construction is shown and described in detail in said White & Young application. 17 indicates a feed-roller detachably mounted between the side-members 9—10 of the chart-holding frame and arranged to carry a supply of the paper ribbon which forms the chart. 18 indicates a rewinding-roller, which is mounted similarly to the roller 17, for rewinding the chart after it has passed over the platen and received the record. 19 indicates a guide-roller, over which the chart passes. 20 indicates a gear, which is mounted within the side member 9 of the chart-holding frame upon one end of the shaft 15 so as to rotate therewith. Said gear operates through intermediate pinions 21—22 to drive a gear 23 mounted upon a stud 24, as shown in Fig. 5. Said stud also carries a pulley 26, which is adapted to rotate with the gear 23 and alines with pulleys 27—28 mounted, respectively, on the axes of the feed and rewinding rollers. A belt 29 passing over the pulleys 26, 27 and 28 operates to drive the rewinding roller 18 in the direction indicated by the arrow in Fig 5 to rewind the chart thereon, and also serves as a brake for the feed-roller, as described in said White & Young application.

30 indicates a spool, which is mounted upon and secured to one end of a longitudinally-movable shaft 31 which extends into the tubular shaft 15 and is connected to rotate therewith, but is longitudinally movable independently thereof, as shown and described in said White & Young application. The spool 30 has a plurality of holes 32 in its outer face and forms one member of a clutch by which the shaft 31 and through it the tubular shaft 15 and platen 14 are connected with the driving mechanism hereinafter described. The shaft 31 with the spool 30 are moved to connect said shaft with or disconnect it from the driving mechanism by means of a swinging arm 33 mounted upon a pivot 34 and having a pin 35 which projects into the annular channel of the spool 30, so that by swinging the arm 33 upon its pivot, the shaft 31 may be moved in the desired direction. For the purpose of swinging the arm 33 and also for locking the chart-holding frame in operative position, we provide a knob 36 pivotally mounted in the side member 9 of the chart-holding frame and having an eccentrically-disposed pin 37 which enters a suitable slot in the arm 33. Thus, by rotating the knob 36 the arm 33 may be swung in one direction or the other. The knob 36 also carries a disk 38 having a flattened portion 39 upon its periphery. The disk 38 is for the purpose of locking the chart-holding frame to the stationary portion of the instrument and is so disposed that when the flattened portion 39 of said disk is in line with the margin of the side member 9, which is the unlocking position, the arm 33 will then be in position to hold the spool 30 out of engagement with the driving mechanism. When the knob 36 is turned to move the disk 38 out of the position described, and shown in Fig. 5, said disk is arranged to engage the inner margin of a stationary housing 40, shown in Fig. 1, in which is placed the driving motor and the devices by which it is connected with the spool 30 and shaft 31. The latter movement also connects the spool 30 with the driving mechanism in the manner hereinafter described.

The motive power is supplied by a driving motor 41 mounted in the housing 40, as shown in Fig. 2. This motor, which is preferably a spring-driven clockwork apparatus, is connected by a suitable train of gears, indicated by dotted lies in Fig. 2, to a pinion 42, which, when the chart-holding frame is in position, lies opposite to and parallel with the spool 30. Said pinion is provided with pins 43 which project toward the spool 30 and are adapted to enter the perforations 32 therein, so that said spool and the pinion 42 together form a clutch for connecting the driving motor 41 with the platen 14. 44 indicates a key socket in the front of the housing 40 for winding the driving motor 41. The construction thus far described is all illustrated and described more in detail in the said White & Young application, and is not claimed herein as our joint invention.

In order to prevent the spring of the driving motor from running down when the chart-holding frame has been removed, or when the platen is disconnected from said motor, we provide for automatically locking the driving motor against operation when the platen is disconnected therefrom, and for releasing said motor when the platen is operatively connected therewith and the devices by which this is accomplished are as follows: 45 indicates a ratchet-wheel mounted upon a shaft 46 which also carries the pinion 42, as shown in Figs. 2 and 3. 47 indicates a pawl mounted upon a pivot 48 and adapted to engage the ratchet-wheel 45. A spring 49 normally holds the pawl 47 in engagement with said ratchet-wheel. 50 indicates an arm connected with the pawl 47, forming substantially a bell-crank lever. The arm 50 projects opposite one end of a sliding plate 51 mounted upon screws 52 which project through a longitudinal slot 53 in said plate, as shown in Fig. 3. This sliding plate is arranged adjacent to the locking disk 38 in a position perpendicular to the plane of said disk. The outer end of said plate is adapted to bear upon a cam surface 54 provided on said disk, as shown in Figs. 3 and 5, said cam being arranged, when the knob 36 is turned in the proper direction, to move the plate 51 inward, thereby swinging the arm 50 to the left, as shown in Fig. 3, and disconnecting the pawl 47 from the ratchet-wheel 45. When the knob 36 is turned in the opposite direction, the cam 54 is so moved as to permit the plate 51 to move to the right under the influence of the spring 49 acting through the arm 50, thus permitting the pawl 47 to again engage the ratchet-wheel 45. The adjustment of these several parts is such that the pawl 47 is moved out of engagement with the ratchet-wheel 45 when the knob 46 is turned to lock the chart-holding frame to the housing 40, and said pawl is permitted to engage the ratchet-wheel 45 when said knob is turned to unlock the chart-holding frame. It follows that the driving motor is locked against operation when the chart-holding frame is unlocked and the platen disconnected from said motor, while the motor is released and is free to operate when it is connected with the platen and the chart-holding frame is locked in position,—these operations being automatically effected.

Besides the devices for locking the motor, just described, it is also necessary to provide means for controlling the rate of rotation of the platen, and for locking the platen against rotation when the chart-holding frame is in operative position but is not in actual use, and for these purposes we provide controlling and locking mechanism, as best shown in Figs. 5, 6 and 7. Such mechanism comprises a governor composed of the following elements: 55 indicates a stationary disk carried by a plate 56 secured to the side member 9 in any suitable way. Said disk is provided with a peripheral flange 57, as best shown in Figs. 6 and 7. 58 indicates a hole in said disk adjacent to the flange 57. 59 indicates a rotary vane mounted on a pivot 60 which also carries a pinion 61, as shown in Fig. 7. Upon the vane 59 is mounted a rod 62, and upon said rod is mounted an arc-shaped shoe 63 which is capable of sliding upon said rod toward and from the pivot 60. The ends of the shoe 63 are connected to springs 64, the opposite ends of said springs being connected to a cross-bar 65 also mounted on the vane 59 and adjustably secured in position upon the rod 62. The purpose of adjusting the cross-bar is to vary the tension of the springs 64. It will be apparent that when the vane 59 is rotated the shoe 63 will move outward toward the flange 57 under the action of centrifugal force, and will bear more or less forcibly against such flange, consequently acting as a brake upon the vane and regulating its speed. The pinion 61 meshes with a gear 66 mounted on a pivot 67 which also carries a pinion 68, shown in Fig. 5, the latter pinion meshing with the gear 23, as shown in said figure. As the gear 23 is connected by a train of gears with the gear 20, as has been described, and the latter gear is mounted on the shaft 15 which carries the platen, it will be apparent that the rate of rotation of the platen will be controlled by the governor. In order to lock the platen against rotation, a locking lever 69 is provided which is mounted upon a pivot 70, as shown in Fig. 6, said lever having a laterally-projecting lug 71 which is adapted to enter the hole 58 in the plate 55, as shown in Figs. 5, 6 and 7. Said lug is normally held in said hole by a spring 72, as shown in Figs. 5 and 6, which bears against the under side of the arm of said lever at the other side of the pivot 70 from the lug 71. When said lug is in the hole 58, its inner end lies in the path of the vane 59, and consequently it acts as a stop to prevent the rotation thereof. When the opposite end of said lever is pressed downward to move the lug 71 out of the hole 58, the vane is free to rotate. In order to operate the lever 69 from the front of the instrument, we provide a knob 73 which is mounted upon the forward end of a rod 74 mounted in the side member 9, as shown in Fig. 5, and carries at its inner end a cam 75 which is adapted to bear upon the adjacent end of the lever 69. The arrangement is such that by rotating the knob 73 the lever 69 may be rocked to move the lug 71 out of the hole 58 and thereby release the governor and permit the platen to rotate under the action of the driving motor.

It will be apparent from the foregoing description that in the construction shown the movement of the chart is not chronometrically controlled, as is the case in the instrument described in said Otis White application hereinbefore referred to, but is controlled entirely by a suitable governor which restrains the free operation of the driving motor, and the movement of the chart may be entirely stopped by simply turning the knob 73 to lock the governor against operation, all the other connections being left undisturbed. The speed of the chart when in operation may be easily varied by adjusting the position of the cross-bar 65, which is held in place by a set-screw, or other convenient device. Furthermore, when the chart-holding frame is unlocked for removal, the motor is automatically locked so that it cannot run down, and is automatically unlocked when the chart-holding frame is restored to operative position and secured in such position. Coincidently, the platen is disconnected from or connected with the motor, as the case may be.

While we prefer to use the governor shown and described, our invention, generically considered, is not limited to the use of any particular form of governor, as any governor suitable for the purpose may be employed. In other respects also our invention is not limited to the specific construction shown and described, but includes generically the subject-matter of the broader claims.

That which we claim as our invention, and desire to secure by Letters Patent, is—

1. A graphic recording instrument, comprising a base, a removable chart-holding frame, chart-moving means carried by said frame, a driving motor carried by the base, for driving said chart moving means, and externally-operable means for locking said motor against operation and for connecting the motor with and disconnecting it from the chart-moving means.

2. A graphic recording instrument, comprising a base, a removable chart-holding frame, chart-moving means carried by said frame, a driving motor carried by the base, and externally-operable means for locking and unlocking the motor and for connecting the motor with the chart-moving means and disconnecting it therefrom, and for locking the chart-holding frame to the base.

3. A graphic recording instrument, comprising a base, a removable chart-holding frame, chart-moving means carried by said frame, a driving motor carried by the base, an externally-mounted member, and means operated by said member for simultaneously locking the motor against operation and disconnecting the motor from the chart-moving means.

4. A graphic recording instrument, comprising a base, a removable chart-holding frame, chart-moving means carried by said frame, a driving motor carried by the base, an externally-mounted member, and means operated by said member for locking the chart-holding frame to the base and unlocking it, and operating when the chart-holding frame is unlocked to lock the motor against operation.

5. A graphic recording instrument, comprising a base, a removable chart-holding frame, chart-moving means carried by said frame, a driving motor carried by the base, an externally-mounted member, and means operated by said member for locking the chart-holding frame to the base and unlocking it, and operating when the chart-holding frame is unlocked to lock the motor against operation and also to disconnect the motor from the chart-moving means.

6. A graphic recording instrument, comprising a base, a removable chart-holding frame, chart-moving means carried by said frame, a driving motor carried by the base, a member mounted externally on the chart-holding frame, and means operated by said member for locking the chart-holding frame to the base and unlocking it, and operating when the chart-holding frame is unlocked to lock the motor against operation and also to disconnect the motor from the chart-moving means.

7. A graphic recording instrument, comprising a base, a removable chart-holding frame, chart-moving means carried by said frame, a driving motor carried by the base for driving said chart moving means, means carried by the chart-holding frame for locking said chart-moving means against operation, and means for locking the motor against operation.

8. A graphic recording instrument, comprising a base, a removable chart-holding frame, chart-moving means carried by said frame, a driving motor carried by the base for driving said chart moving means, means carried by the chart-holding frame for locking said chart-moving means against operation, an externally-operable member carried by said chart-holding frame for operating said locking means, and means for locking the motor against operation.

9. A graphic recording instrument, comprising a base, a removable chart-holding frame, chart-moving means carried by said frame, a driving motor carried by the base for driving said chart moving means, means carried by the chart-holding frame for locking said chart-moving means against operation, and means mounted on the base for locking the motor against operation before the chart-holding frame is removed.

10. A graphic recording instrument, comprising a base, a removable chart-holding frame, chart-moving means carried by said frame, a driving motor carried by the base, means carried by the chart-holding frame for locking said chart-moving means against operation, an externally-operable member carried by said chart-holding frame for operating said locking means, and means mounted on the base for locking the motor against operation when the chart-holding frame is removed.

11. A graphic recording instrument, comprising a base, a removable chart-holding frame, chart-moving means carried by said frame, a driving motor carried by the base, means carried by the chart-holding frame for locking said chart-moving means against operation, means mounted on the base for locking the motor against operation when the chart-holding frame is removed, and manually operable means for releasing the motor when the chart-holding frame is in operative position.

12. A graphic recording instrument, comprising a base, a removable chart-holding frame, chart-moving means carried by said frame, a driving motor carried by the base, means carried by the chart-holding frame for locking said chart-moving means against operation, an externally-operable member carried by said chart-holding frame for operating said locking means, means mounted on the base for locking the motor against operation when the chart holding frame is removed, and externally-operable means for releasing the motor when the chart-holding frame is in operative position.

13. A graphic recording instrument, comprising a base, a removable chart-holding frame, chart-moving means carried by said frame, a driving motor carried by the base, means carried by the chart-holding frame for locking said chart-moving means against operation, means mounted on the base for locking the motor against operation when the chart-holding frame is removed, and manually-operable means for connecting the motor with the chart-moving means when the chart-holding frame is in operative position and for releasing the motor.

14. A graphic recording instrument, comprising a base, a removable chart-holding frame, chart-moving means carried by said frame, a driving motor carried by the base and adapted to be operatively connected with said chart-moving means, and means carried by the chart-holding frame for governing the speed of the chart without adjusting the motor.

15. A graphic recording instrument, comprising a base, a removable chart-holding frame, chart-moving means carried by said frame, a driving motor carried by the base and adapted to be operatively connected with said chart-moving means, and adjustable means carried by the chart-holding frame for governing the speed of the chart without adjusting the motor.

16. A graphic recording instrument, comprising a base, a removable chart-holding frame, chart-moving means carried by said frame, a driving motor carried by the base and adapted to be operatively connected with said chart-moving means, adjustable means for governing the speed of the motor, and means carried by and operable independently of movement of the chart-holding frame for locking the chart-moving means against operation.

17. A graphic recording instrument, comprising a base, a removable chart-holding frame, chart-moving means carried by said frame, a driving motor carried by the base and adapted to be operatively connected with said chart-moving means, means carried by the chart-holding frame for governing the speed of the chart without adjusting the motor, and means carried by the chart-holding frame for locking the chart-moving means against operation.

18. A graphic recording instrument, comprising a base, a removable chart-holding frame, chart-moving means carried by said frame, a driving motor carried by the base and adapted to be operatively connected with said chart-moving means, adjustable means carried by the chart-holding frame for governing the speed of the chart without adjusting the motor, and means carried by the chart-holding frame for locking the chart-moving means against operation.

19. A graphic recording instrument, comprising a base, a motor carried thereby, chart-moving means mounted on the base and actuated by said motor, means for locking the motor against operation, and means for locking the chart-moving means against operation.

20. A graphic recording instrument, comprising a base, a motor carried thereby, chart-moving means mounted on the base and actuated by said motor, means for controlling the speed of the chart, and means coöperating with said controlling means for locking the chart against operation.

21. A graphic recording instrument, comprising a base, chart-moving means supported by the base, a driving motor connected with said chart-moving means, and a governor separate from the motor and connected with and operated by said chart-moving means for controlling the speed of the chart.

OTIS WHITE.
ROBERT C. LANPHIER.